(12) United States Patent
Lauer

(10) Patent No.: US 7,859,790 B1
(45) Date of Patent: Dec. 28, 2010

(54) TRANSDUCERS FOR PERPENDICULAR RECORDING WITH WRITE POLE TIP ANGLED TOWARD MEDIA

(76) Inventor: Mark A. Lauer, 3618 Trenery Dr., Pleasanton, CA (US) 94588

(*) Notice: Subject to any disclaimer, the term of this patent is extended or adjusted under 35 U.S.C. 154(b) by 0 days.

(21) Appl. No.: 12/405,074

(22) Filed: Mar. 16, 2009

Related U.S. Application Data

(63) Continuation of application No. 10/902,673, filed on Jul. 29, 2004, now Pat. No. 7,508,624.

(60) Provisional application No. 60/491,708, filed on Aug. 1, 2003.

(51) Int. Cl.
*G11B 5/127* (2006.01)
*G11B 5/31* (2006.01)

(52) U.S. Cl. .................. 360/122; 360/125.15

(58) Field of Classification Search ............ 360/122, 360/125.54, 125.62, 125.13–125.15, 125.59–125.61, 360/125.64–125.66, 125.09–125.11
See application file for complete search history.

(56) References Cited

U.S. PATENT DOCUMENTS

| | | | |
|---|---|---|---|
| 5,246,884 A | 9/1993 | Jaso et al. .................. 438/693 |
| 6,685,882 B2 | 2/2004 | Deevi et al. ................ 420/124 |
| 6,687,089 B2 | 2/2004 | Chiba et al. ............... 360/235.4 |
| 6,710,973 B2 | 3/2004 | Okada et al. ................ 360/125 |
| 6,775,099 B2 | 8/2004 | Kuroda et al. ........... 360/125.06 |
| 6,809,899 B1 | 10/2004 | Chen et al. .............. 360/125.13 |
| 6,842,313 B1 | 1/2005 | Mallary ...................... 360/319 |
| 6,859,343 B1 | 2/2005 | Alfoqaha et al. ........ 360/125.72 |
| 7,002,775 B2 | 2/2006 | Hsu et al. ............... 360/125.03 |
| 7,023,658 B1 | 4/2006 | Knapp et al. ................. 360/126 |
| 7,126,790 B1 * | 10/2006 | Liu et al. ............... 360/125.53 |
| 7,245,454 B2 | 7/2007 | Aoki et al. ................ 360/125.1 |
| 7,508,624 B1 * | 3/2009 | Lauer ......................... 360/122 |
| 2002/0024765 A1 | 2/2002 | Kutsuzawa et al. ......... 360/126 |
| 2002/0170165 A1 | 11/2002 | Plumer et al. ............ 29/603.14 |
| 2003/0112555 A1 | 6/2003 | Sato et al. ................... 360/126 |
| 2003/0112560 A1 | 6/2003 | Takeshita et al. ........... 360/135 |
| 2003/0193744 A1 | 10/2003 | Takahashi et al. .......... 360/126 |
| 2004/0150910 A1 | 8/2004 | Okada et al. ................ 360/125 |
| 2005/0044699 A1 | 3/2005 | Khera et al. ............. 29/603.12 |
| 2005/0068669 A1 | 3/2005 | Hsu et al. ................... 360/125 |
| 2005/0219744 A1 | 10/2005 | Feldbaum et al. ........... 360/126 |
| 2005/0237665 A1 | 10/2005 | Guan et al. ................. 360/125 |

* cited by examiner

*Primary Examiner*—Brian E Miller
(74) *Attorney, Agent, or Firm*—Silicon Edge Law Group LLP; Mark A. Lauer

(57) ABSTRACT

A write pole tip for a magnetic head has a trailing edge that is closer than a leading edge to a perpendicular recording medium, so that the write signal strength of the trailing edge is greater than that of the leading edge. Such an angled pole tip can write a sharp magnetic pattern with the trailing edge, reducing erroneous writing. A layer of physically hard material such as diamond-like carbon (DLC) may adjoin the trailing edge, the physically hard material layer protruding slightly after polishing of the media-facing surface due to its resistance to lapping. This can form an acute corner of the write pole tip adjacent to the physically hard material layer. The trailing edge may be longer than the leading edge, and the write pole tip may have a trapezoidal shape.

21 Claims, 8 Drawing Sheets

TRANSDUCERS FOR PERPENDICULAR RECORDING WITH WRITE POLE TIP ANGLED TOWARD MEDIA

CROSS-REFERENCE TO RELATED APPLICATIONS

This application claims the benefit under 35 U.S.C. §120 of (is a continuation of) application Ser. No. 10/902,673, filed Jul. 29, 2004, now U.S. Pat. No. 7,508,624, which in turn claims the benefit under 35 U.S.C. §119(e) of provisional application Ser. No. 60/491,708, filed Aug. 1, 2003, both of which are by the same inventor and are incorporated by reference.

SUMMARY

In one embodiment a write pole tip is disclosed having a trailing edge that is closer than a leading edge to a perpendicular recording medium, so that the write signal strength of the trailing edge is greater than that of the leading edge. Such an angled pole tip can write a sharp magnetic pattern with the trailing edge, reducing erroneous writing. A layer of physically hard material such as diamond-like carbon (DLC) may adjoin the trailing edge, the physically hard material layer protruding slightly after polishing of the media-facing surface due to its resistance to lapping. This can form an acute corner of the write pole tip adjacent to the physically hard material layer.

In one embodiment a write pole tip is disclosed having a trailing layer that is closer than a leading layer to a perpendicular recording medium, with a physically hard material layer adjoining a leading edge and a trailing edge of the trailing layer. In one embodiment a physically hard material layer can serve as a nonconducting laminate disposed between the leading layer and the trailing layer to reduce eddy currents. In one embodiment at least one physically hard material layer can also adjoin a sensor so that the sensor also protrudes slightly toward the recording medium.

In one embodiment a material that is physically softer than the pole tip material can adjoin the leading edge of the write pole, the physically softer material being recessed at the media-facing surface relative to the pole tip and causing the leading corner of the pole tip to have an obtuse angle. In one embodiment, a first material that is physically harder than the pole tip material can adjoin the trailing edge of the write pole and a second material that is physically softer than the pole tip material can adjoin the leading edge of the write pole, accentuating the slope of the pole tip relative to the media. In one embodiment, a first material that is physically harder than the pole tip material can adjoin the trailing edge of the write pole and softer material can adjoin the leading edge and both sides of the write pole, accentuating the slope of the pole tip and reducing side writing when the pole tip is skewed relative to a medium track.

In one embodiment the write pole tip may have a trailing edge that is longer than its leading edge, which helps to reduce side writing. For example, by using the physically hard material that adjoins the trailing edge as an etching mask, an angled IBE can create a write pole tip having a substantially trapezoidal shape. In one embodiment, an auxiliary pole tip can be formed that is separated from the write pole tip by a submicron layer of physically hard material, the auxiliary pole tip deflecting the write flux from the write pole tip to an angle from perpendicular to facilitate rotation of the media layer bits. In an alternative embodiment, the return pole tip can be separated from the write pole tip by a submicron layer of physically hard material, the return pole tip deflecting the write flux from the write pole tip to an angle from perpendicular to facilitate rotation of the media layer bits.

DETAILED DESCRIPTION

Figure 1:
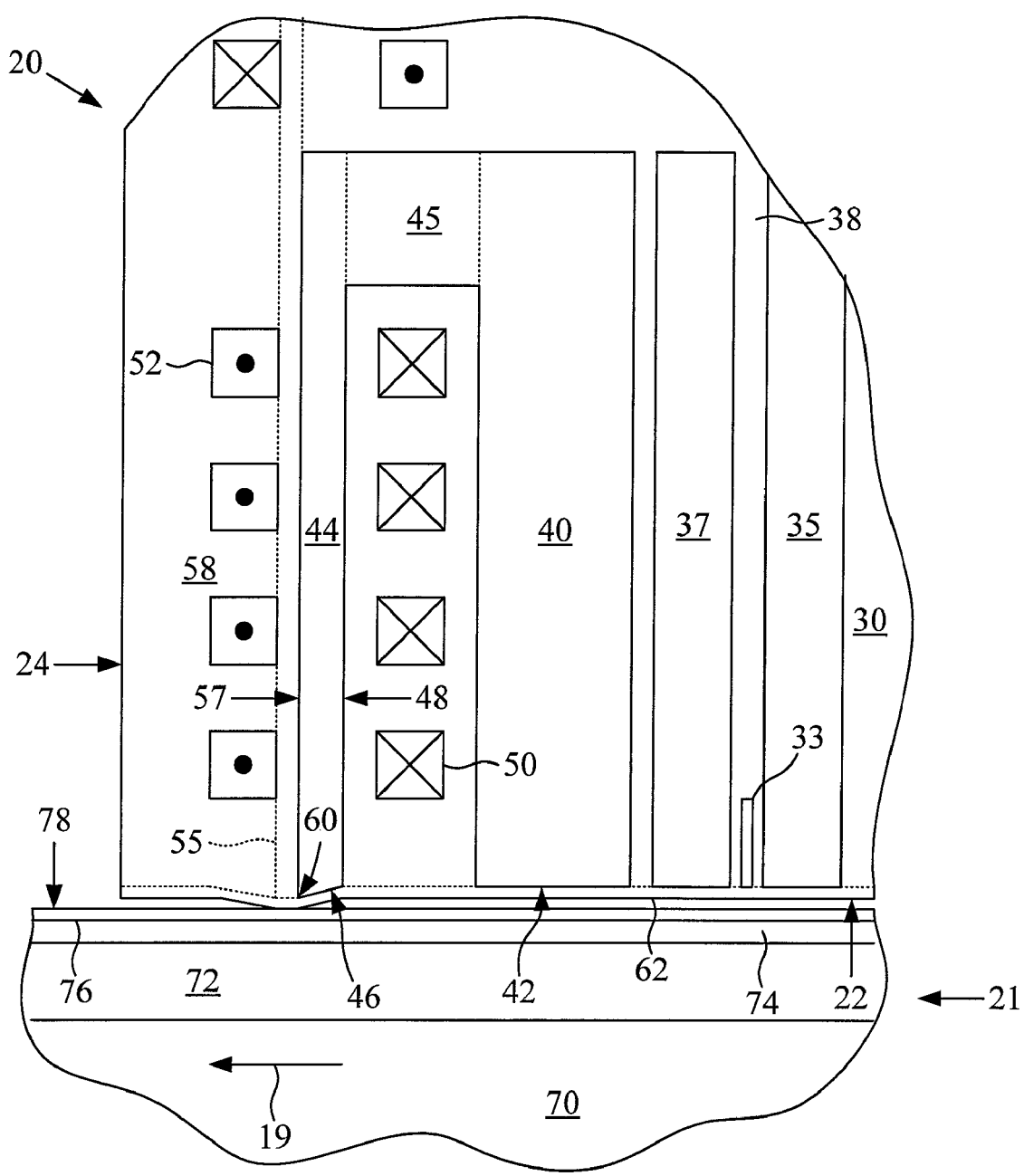
FIG. 1 is a cutaway cross-sectional view of a first embodiment of an electromagnetic transducer designed for writing and reading information on a medium such as a rigid disk.

FIG. 1 is a cross-sectional view of an electromagnetic transducer 20 designed for writing and reading information on a medium 21 such as a rigid disk. The transducer 20 is part of a larger body that may be termed a head or slider, which has a media-facing surface 22, a trailing end 24 and a leading end that is not shown in this figure. The medium 21 is moving relative to transducer 20 in a direction shown by arrow 19.

Transducer 20 has been formed in a number of thin layers along with thousands of similar transducers on a wafer substrate 30, which may be made of various materials known in the industry, such as alumina-titanium-carbide. The substrate 30 and attached layers were then cut into individual heads that were worked to form surfaces such as media-facing surface 22. A first low coercivity, high permeability (soft magnetic) shield layer 35 has been formed on the substrate or a seed layer, not shown, followed by a magnetoresistive (MR) sensor 33 and a second soft magnetic shield 37. The MR sensor can be any transducer that senses a magnetic field with electrical resistance or conductivity, such as a spin valve sensor, spin-dependent tunneling sensor, giant MR sensor, etc. Nonmagnetic, electrically insulating material 38 such as alumina is disposed between the shields and adjacent to the MR sensor 33.

A first pole layer 40 of soft magnetic material such as permalloy is separated from shield 37 by additional insulating material, and terminates in a media-facing first pole tip 42. The first pole layer 40 is magnetically coupled to a second soft magnetic pole layer 44 by a soft magnetic stud 45. The second soft magnetic pole layer 44 terminates in a media-facing second pole tip 46. While the first pole layer 40 can be seen to be thicker than the second pole layer 44, the first pole layer 40 is also much wider than the second pole layer 44 in a dimension perpendicular to the cross-section shown in FIG. 1, and the area of first pole tip 42 is much greater than that of second pole tip 46. Due to the higher concentration of flux passing through the second pole layer 44 and the second pole tip 46, those elements may be termed the recording pole layer and tip, respectively. The recording pole layer 44 or a trailing layer of the recording pole layer may be made of a high magnetic saturation (high $B_{SAT}$) material such as a predominantly-iron nickel-iron alloy (e.g., $Ni_{45}Fe_{55}$), CoZrTa, predominantly-iron FeN or FeNX, where X is Al, Rh, etc.

A first coil layer 50 has plural sections that wind between pole layers 40 and 44, and is connected to a second coil layer 52 that winds in an opposite direction, so that the magnetic field from coil layers 50 and 52 add constructively in the area of pole layer 44, causing a magnetic field in that pole layer to be directed toward or away from the medium 21.

A layer 55 of physically hard material (e.g., DLC, silicon-carbide (SiC), tetrahedral amorphous carbide (ta-C), diamond (C), boron-carbide ($B_4C$), boron-nitride (BN) or other insulating materials that are harder than alumina) adjoins a trailing edge 57 of second pole layer 44. Insulating material 58 such as alumina has been formed atop the second coil layer 52, and other insulating material such as baked photoresist may be disposed between the sections of that layer 52. The greater hardness of layer 55 causes that layer to protrude at the media-facing surface 22 compared to other layers, because layer 55 had greater resistance to lapping and polishing that was used to form the media-facing surface 22. A trailing corner 60 of the second pole tip 46 forms an acute angle near the hard layer 55. After lapping and polishing, an overcoat 62 has been formed on the transducer 20 to protect it from wear and corrosion, the overcoat made of physically hard material such as DLC, SiC or ta-C.

The medium 21 in this embodiment is a disk having a self-supporting substrate 70 of inflexible material such as aluminum or glass, over which a soft magnetic underlayer 72 has been formed. A high coercivity media layer 74 is disposed over the underlayer 72 and beneath a disk overcoat 76. The media layer 74 may have an easy axis of magnetization that is substantially perpendicular to a surface 78 of the medium 21, and may be formed of a plurality of layers, such as magnetic alloy layers separated by a nonmagnetic metal layer, with a fine grained crystalline structure to reduce noise. The soft magnetic underlayer 72 can form a magnetic circuit with the soft magnetic layers 40, 44 and 45 of the transducer 20, the magnetic flux of the circuit traversing the media layer 74 for writing to the medium 21. Because of the large difference in area disposed proximate to the medium 21 of the first pole tip 42 compared to the second pole tip 46, the second pole tip 46 may communicate concentrated magnetic flux sufficient to write a signal on the media layer 74 whereas the first pole tip 42 communicates dispersed magnetic flux insufficient to write a signal on the media layer 74. For example, the first pole tip may have an area that is at least two or three orders of magnitude greater than that of the second pole tip.

The media-facing surface 22 of the head is shown operating in contact with the disk surface adjacent to trailing corner 60 but may also float less than 100 Å above the disk surface. The media-facing surface 22 may protrude adjacent to trailing corner 60 by between a few angstroms and about 100 Å, depending on various factors including the relative size and hardness of layers 55 and 44. The magnetic signal strength at the medium layer 74 from pole tip 46 depends greatly on the distance between the pole tip 46 and the medium layer 74. For a contact recording embodiment in which the combined thickness of transducer overcoat 62 and disk overcoat 76 is less than 100 Å, forming recording 46 pole tip to have a leading edge 48 that is 100 Å further than trailing edge 57 from the media layer 74 can produce dramatically stronger signal strength at the trailing corner 60, which may write to the media while the leading edge 48 of pole tip 46 does not.

The thickness of hard layer 55 may be in a range between about 100 Å and about 1 μm, and its width (measured in a direction perpendicular to the cross-section of FIG. 1) may be within a similar range of values. In one embodiment, the width of hard layer 55 may be substantially equal to the width of the trailing corner 60, which defines the width of a track written by the pole 46. In that case, the width of the hard layer 55 and that of the trailing pole layer 44 may both be defined by directed etching such as ion beam etching (IBE) or reactive ion etching (RIE). In addition to the materials mentioned above, other materials that may be used for hard layer 55 include diamond (C), boron (B), boron-nitride (BN), boron carbide ($B_4C$), and aluminum boride ($AlB_{12}$), all of which have a Vickers hardness (HV) greater than that of alumina ($Al_2O_3$).

Figure 2:
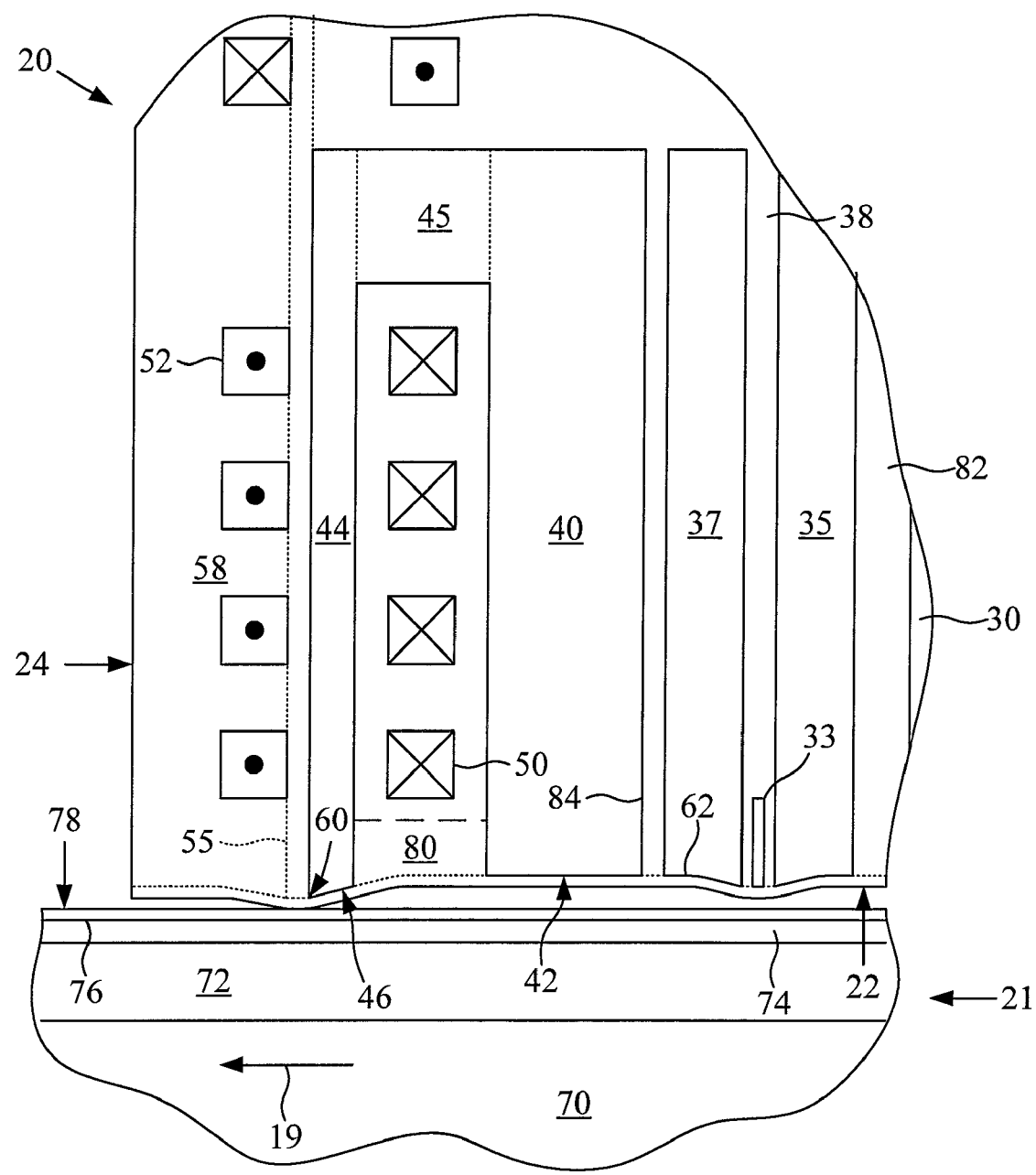
FIG. 2 is a cutaway cross-sectional view of a second embodiment an electromagnetic transducer designed for writing and reading information on a medium such as a rigid disk.

In FIG. 2 an optional, relatively soft material layer 80 is disposed between the pole tips 42 and 46. The layer 80 is physically softer than alumina and so has been removed during lapping and polishing at a greater rate than the alumina insulating layers, forming a recess in the media-facing surface adjacent to pole tip 46. This can cause the leading edge 48 of pole tip 46 to be further removed from the media than would otherwise be the case, so that less signal is transmitted to the medium from the leading edge of that pole tip, amplifying the signal written by the trailing edge. Examples of materials that can be used to form the soft material layer 80 include aluminum nitride (AlN), silicon nitride ($Si_3N_4$), silicon dioxide ($SiO_2$), titanium oxide ($TiO_2$), zirconium oxide ($ZrO_2$), hafnium oxide($HfO_2$), thorium oxide($ThO_2$), beryllium oxide(BeO) and magnesium oxide (MgO). Note that these materials are not electrically conductive.

Such a softer material can also be optionally disposed on both sides of the pole tip 46, so that the sides of the pole tip 46 are further recessed compared to the trailing corner 60. This can help to reduce off track writing. A softer material has also been formed in a layer 82 disposed between the substrate and the first shield 35, as well as in a layer 84 disposed between the second shield layer 37 and the first pole layer 40, so that those areas of the media-facing surface 22 are recessed from that adjacent to the recording pole corner 60. A relatively hard material such as DLC, to-C, SiC or the like has been formed in at least one layer disposed between the first shield 35 and the second shield layer 37 in the area shown generally as 38, which has caused the media-facing surface 22 to protrude slightly adjacent to the MR sensor.

Figure 3:
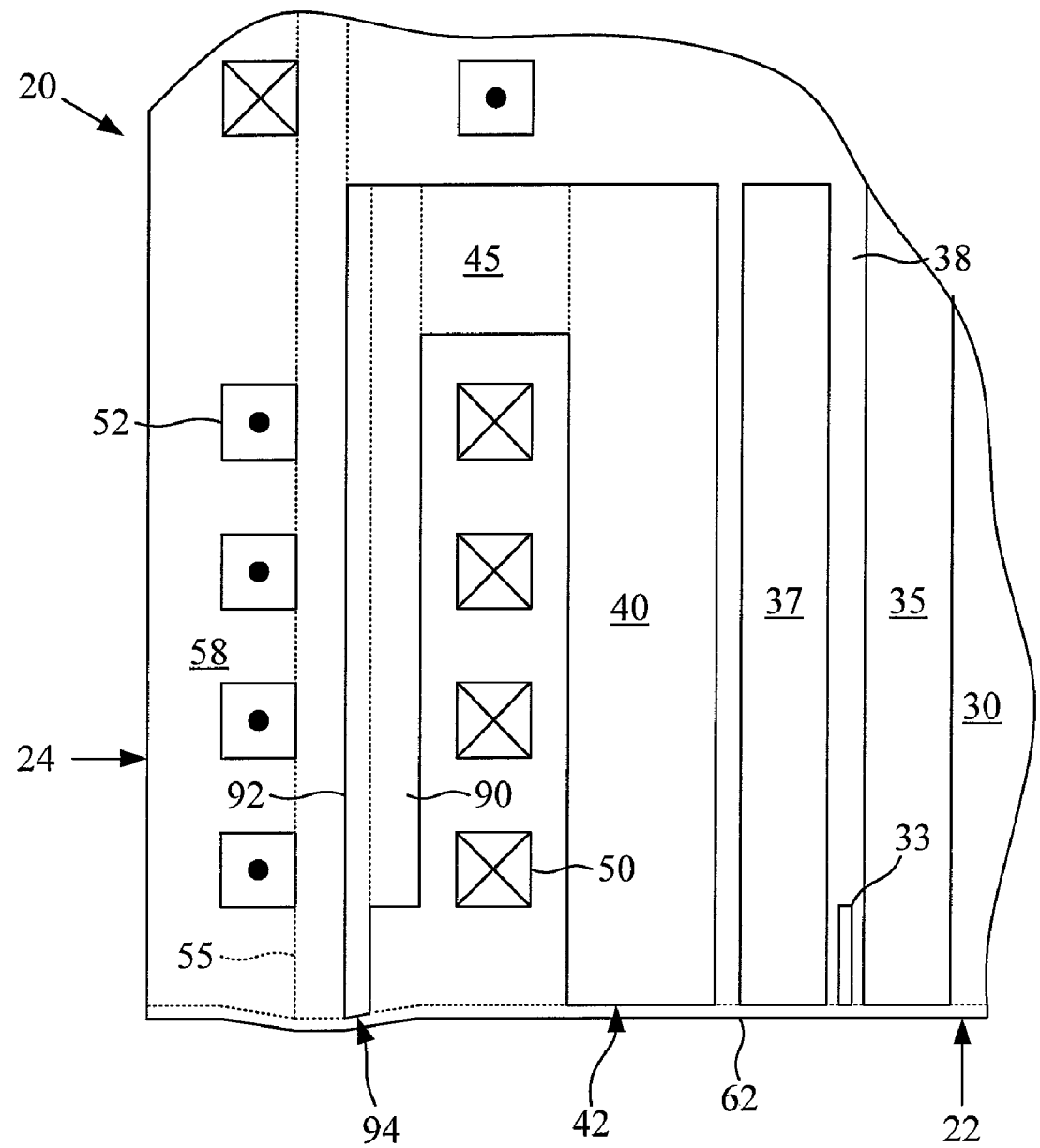
FIG. 3 is a cutaway cross-sectional view of a third embodiment of an electromagnetic transducer designed for writing and reading information on a medium such as a rigid disk.

FIG. 3 shows an embodiment that has plural recording pole layers 90 and 92, layer 92 terminating in recording pole tip 94 while layer 90 terminates between a few nanometers and a few microns further away from the media-facing surface 22. Pole layer 92 may be formed of physical vapor deposited (PVD), high moment material (e.g., $B_{sat}$ greater than 20 kiloGauss). The thickness of pole layer 92 may be in a range between about 10 Å and 1000 Å, and its width (measured in a direction perpendicular to the cross-section of FIG. 1) may be within a similar range of values. In one embodiment, the width, of pole tip 94 may be at least three times the thickness of that pole tip to reduce off track writing. The thickness of hard layer 55 may be in a range between about 100 Å and about 1 μm, and its width (measured in a direction perpendicular to the cross-section of FIG. 1) may be within a similar range of values. In one embodiment, the width of hard layer 55 may be substantially equal to the width of the pole layer 92, which defines the width of a track written by the pole tip 94. In that case, the width of the hard layer 55 and that of the trailing pole layer 92 may both be defined by masking and etching by IBE, RIE or the like.

Figure 4:
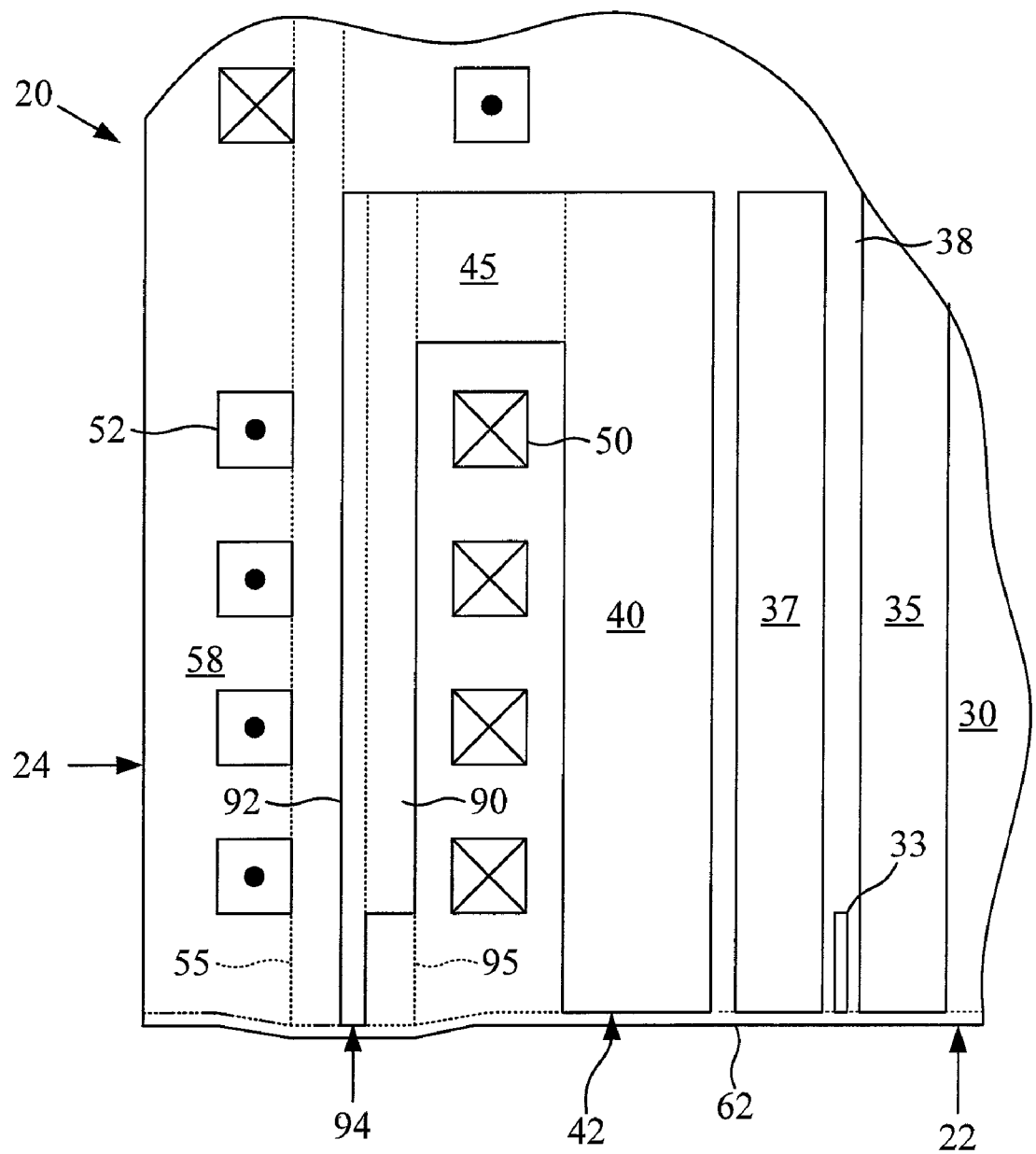
FIG. 4 is a cutaway cross-sectional view of a fourth embodiment an electromagnetic transducer designed for writing and reading information on a medium such as a rigid disk.

FIG. 4 shows an embodiment that has a relatively hard layer 95 such as DLC, ta-C, SiC, BN or the like disposed adjacent to pole layer 94, between pole layer 90 and the hard overcoat 60. Recording pole tip 94 in this case has hard material adjacent to its leading edge and its trailing edge, and can be formed with alumina on the sides of layer 92. Alternatively, a material that is harder or softer than alumina can be disposed on either or both sides of pole layer 92.

Figure 5:
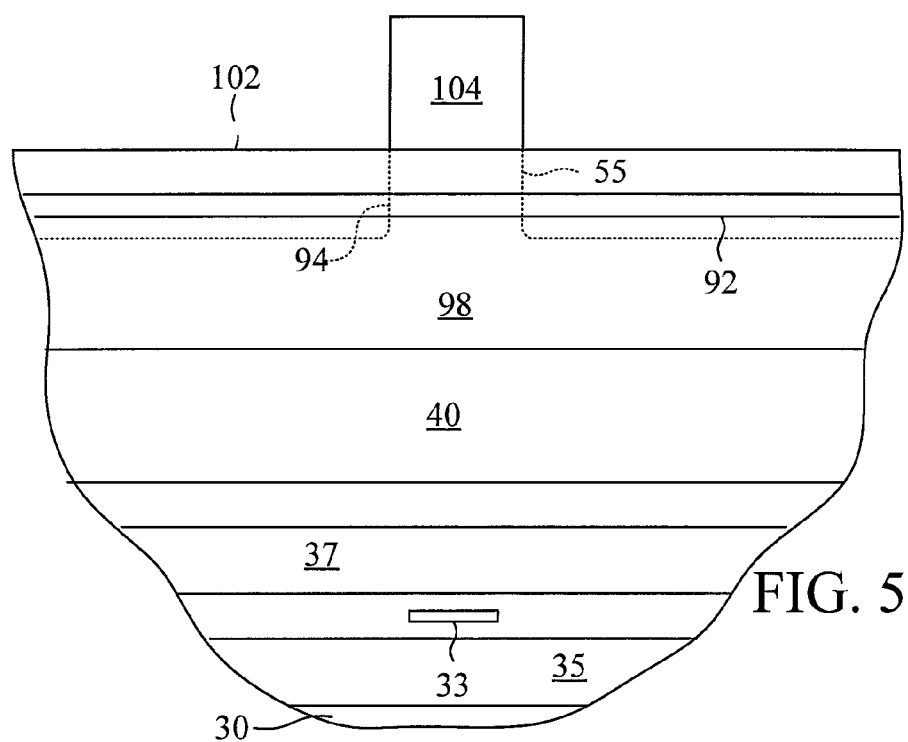
FIG. 5 is a cutaway cross-sectional view of a stage in the fabrication of a transducer similar to that shown in FIG. 3.

FIG. 5 is a cross-sectional view of a stage in the fabrication of a transducer similar to that shown in FIG. 3, the cross-section located near what will become the media-facing surface. A layer 98 of alumina or other insulating material has been formed by sputtering or other PVD atop the return pole layer 40. This layer 98 may be harder or softer than alumina, and may be deposited in a single layer or in plural layers, with a second of the plural layers being formed for example to fill in around an electroplated first recording layer 90, not shown in this figure. The recording pole layer 92 was deposited by PVD on insulating layer 98 and wear resistant material layer 102 deposited on layer 92. A mask 104 of photoresist or the like was formed over layer 102 to a width larger than that desired for pole tip 94. Directed etching such as IBE can then be performed to remove parts of layers 92 and 102 not covered by the mask 104, leaving pole tip 94 covered by a cap layer 55 of hard layer 102. The etching can also remove part of layer 98 that is not covered by the mask, for example leaving a hard insulating material adjacent a leading edge of pole tip 94 and having a width corresponding to that of the pole tip 94.

After additional layers have been deposited the wafer is cut into individual die, one of the die cuts being substantially parallel to the cross-section shown, which is then polished so that hard layer 55 and pole tip 94 protrude slightly. Alternatively, a lift off mask can be formed over recording pole layer 92, leaving a opening over the desired location for pole tip 94 through which a mask of physically hard material is deposited, after which the lift off mask is removed. The physically hard material mask can then be used to protect pole tip 94 during IBE or other directional etching of other parts of layer 92.

Figure 6:
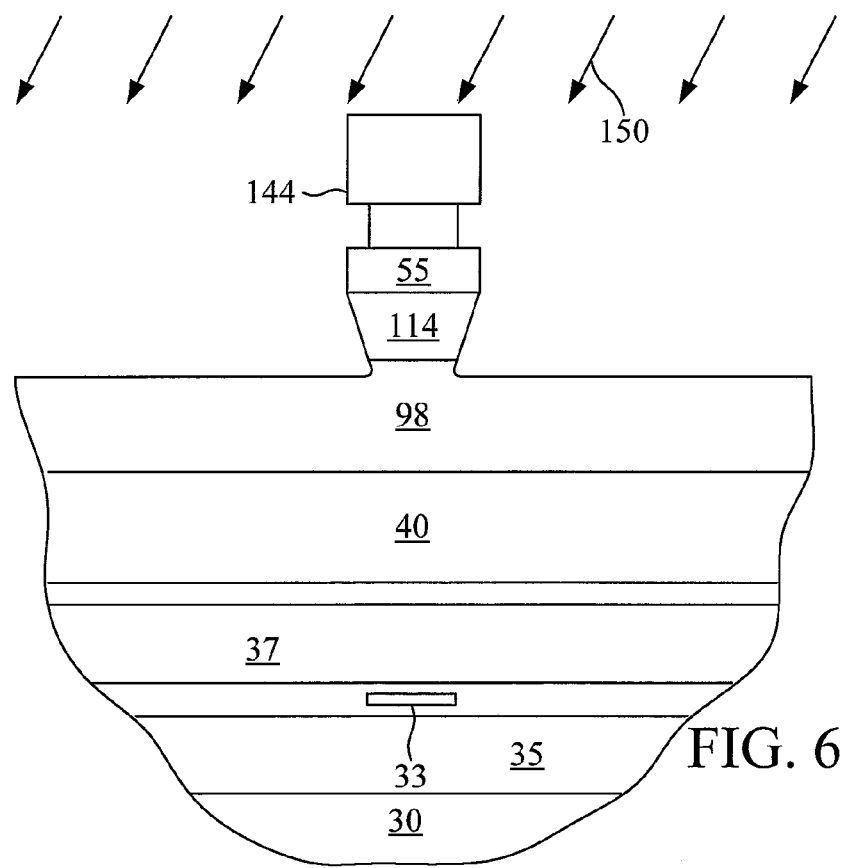
FIG. 6 is a cutaway cross-sectional view of a later step in the fabrication of the transducer shown in FIG. 5.

FIG. 6 is a cross-sectional view of a later step in the fabrication of a transducer similar to that shown in FIG. 5, in which a write pole tip 114 is formed with a trapezoidal shape. Although the mask 104 of FIG. 5 can be used for this purpose, a bilayer mask 144 is shown in this example to facilitate later refill of material around pole tip 114. After directional etching such as IBE or RIE has created a pole tip similar to pole tip 94 of FIG. 5, the etching is angled as indicated by arrows 150 to create the angled walls of pole tip 114. Creating a pole tip 114 with a trailing edge of that is longer than a leading edge has advantages in avoiding side writing, particularly when the trailing edge is also closer than the leading edge to the recording medium.

Figure 7:
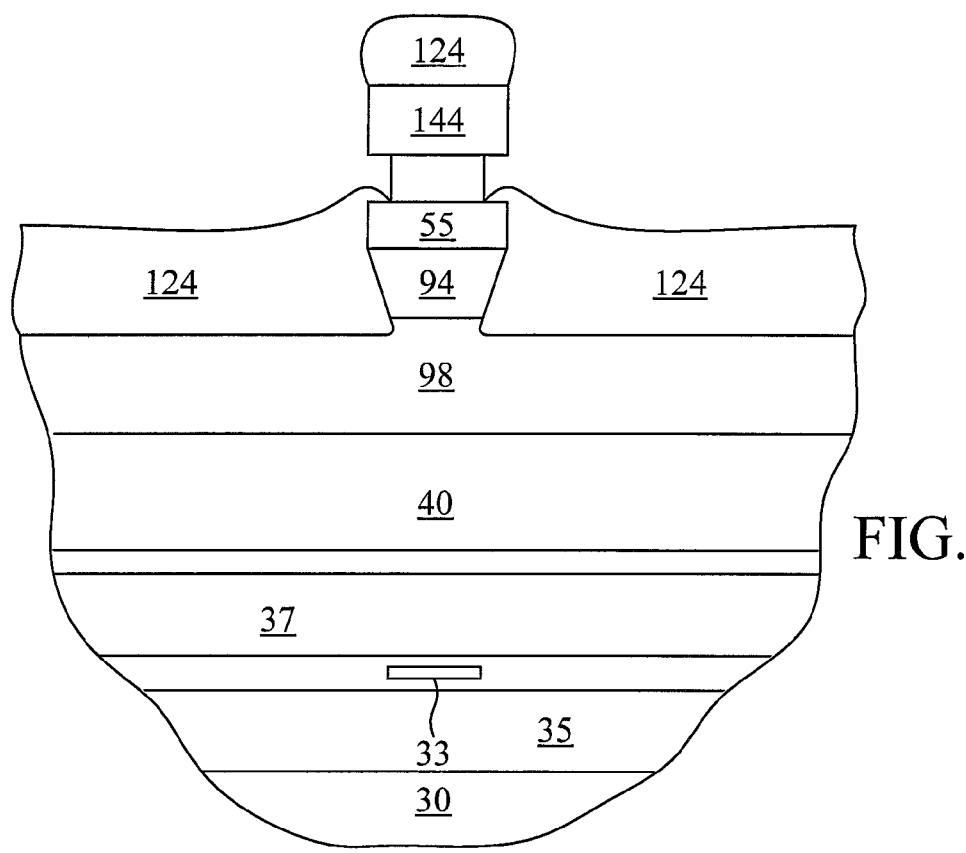
FIG. 7 is a cutaway cross-sectional view of a later step in the fabrication of the transducer of FIG. 6.

FIG. 7 is a cross-sectional view of a later step in the fabrication of a transducer of FIG. 6, in which nonmagnetic, electrically insulating material 124 such as alumina has been formed around pole tip 114 and atop mask 144.

Figure 8:
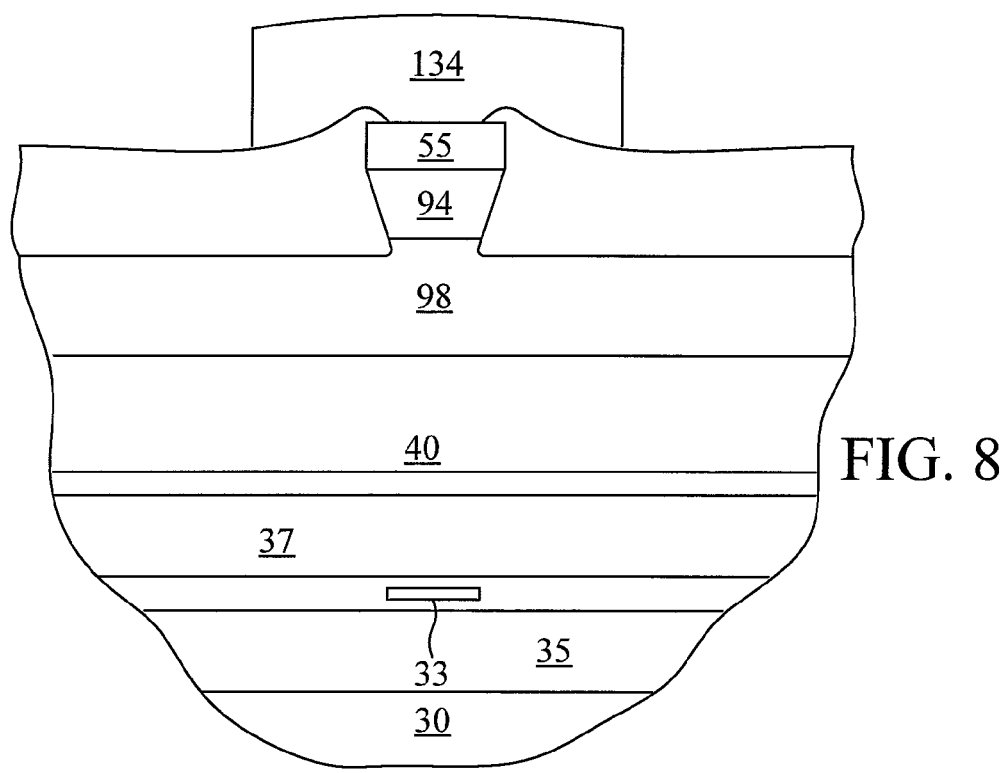
FIG. 8 is a cutaway cross-sectional view of a later step in the fabrication of the transducer of FIG. 7.

FIG. 8 is a cross-sectional view of a later step in the fabrication of a transducer of FIG. 7, in which mask 144 has been lifted off and another pole tip 134 has been formed that is separated from the write pole tip 94 by physically hard layer 55. Pole tip 134 can be part of a return pole layer or an auxiliary pole layer that is formed in addition to the return pole layer, depending upon factors such as the size of pole tip 134 and hard layer 102. Pole tip 134 can be part of a single pole layer that curves over coils or can be a pedestal that is stitched to a longer pole layer.

Figure 9:
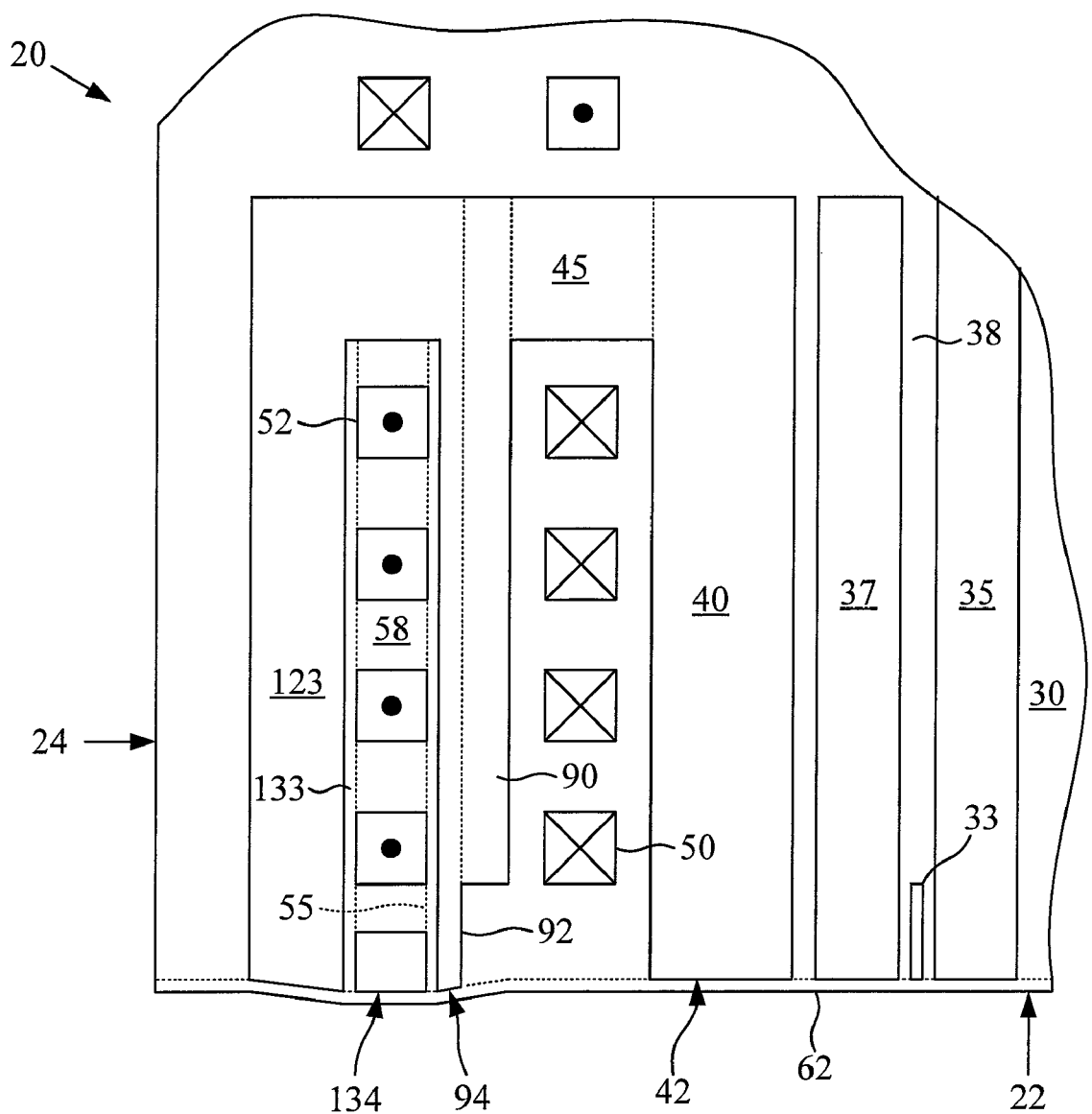
FIG. 9 is a cutaway cross-sectional view of a fifth embodiment an electromagnetic transducer designed for writing and reading information on a medium such as a rigid disk.

FIG. 9 is a cross-sectional view of an embodiment in which pole tip 134 is a pedestal that is magnetically coupled to an auxiliary pole layer 123. An additional layer 123 of physically hard material may optionally be formed between pedestal 134 and pole layer 123, although the combination of layers 123 and 134 may be thought of as the auxiliary pole layer.

Figure 10:
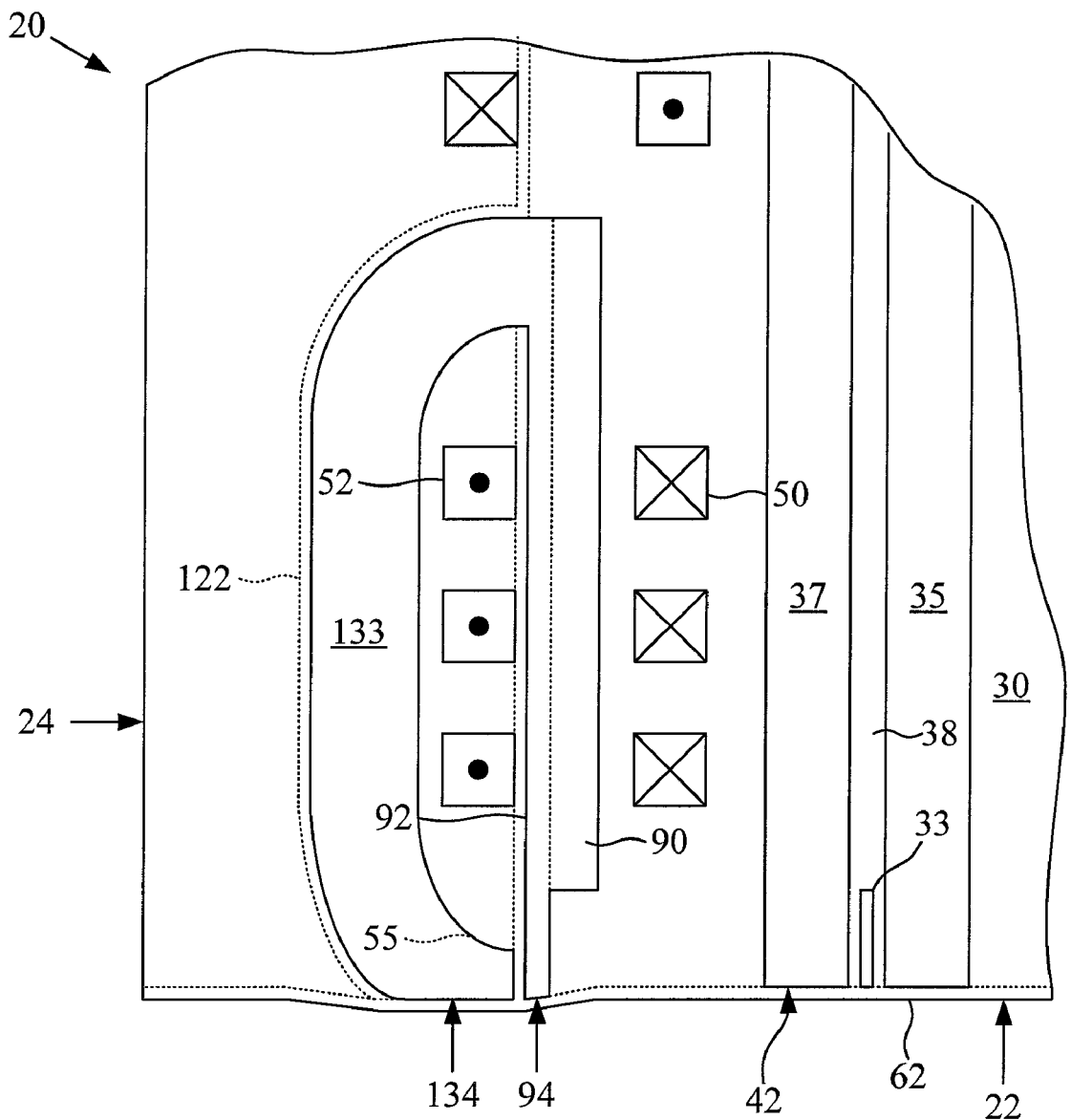
FIG. 10 is a cutaway cross-sectional view of a sixth embodiment an electromagnetic transducer designed for writing and reading information on a medium such as a rigid disk.

FIG. 10 is a cross-sectional view of an embodiment in which pole layer 123 acts as a return pole layer that curves over coils 52 to terminate in pole tip 134. An additional layer 122 of physically hard material may optionally be formed along the trailing edge of pole layer 133.

The invention claimed is:

1. A transducer for recording information on a perpendicular recording medium, the transducer comprising:
    a body having a leading end, a trailing end, and a medium-facing surface;
    a first soft magnetic layer disposed in the body and terminating at a first pole tip disposed adjacent to the medium-facing surface;
    a second soft magnetic layer that is magnetically coupled to the first soft magnetic layer in a part of the body distal to the medium-facing surface, the second soft magnetic layer terminating at a second pole tip disposed adjacent to the medium-facing surface, the second pole tip having a leading edge and a trailing edge, such that the leading edge is closer than the trailing edge to the leading end, and the trailing edge protrudes toward the medium, compared to the leading edge; and
    a nonmagnetic layer that adjoins the trailing edge and does not coat the medium-facing surface.

2. The transducer of claim 1, wherein the nonmagnetic layer has a thickness that is in a range between about one hundred Angstroms and about one micron.

3. The transducer of claim 1, wherein the trailing edge is longer than the leading edge.

4. The transducer of claim 1, wherein the second pole tip has a substantially trapezoidal shape.

5. The transducer of claim 1, wherein the second pole tip is separated from the first pole tip by the nonmagnetic layer.

6. The transducer of claim 1, wherein the first pole tip has an area that is at least two orders of magnitude greater than that of the second pole tip.

7. A transducer for recording information on a relatively-moving medium, the transducer comprising:
    a body having a leading end, a trailing end, and a medium-facing surface;
    a first soft magnetic layer disposed in the body and terminating at a first pole tip disposed adjacent to the medium-facing surface, the first soft magnetic layer having a leading side and a trailing side, such that the leading side is closer than the trailing side to the leading end, the leading side meeting the first pole tip at an acute corner;
    a second soft magnetic layer that is magnetically coupled to the first soft magnetic layer in a part of the body distal to the media-facing surface, the second soft magnetic layer terminating at a second pole tip disposed adjacent to the medium-facing surface, the second pole tip having a leading edge and a trailing edge, such that the leading edge is closer than the trailing edge to the leading end; and
    a nonmagnetic layer adjoining the trailing edge.

8. The transducer of claim 7, wherein the nonmagnetic layer has a thickness that is in a range between about one hundred Angstroms and about one micron.

9. The transducer of claim 7, wherein the trailing edge is closer than the leading edge to the medium.

10. The transducer of claim 7, wherein the trailing edge is longer than the leading edge.

11. The transducer of claim 7, wherein the second pole tip has a substantially trapezoidal shape.

12. The transducer of claim 7, wherein the second pole tip is separated from the first pole tip by the nonmagnetic layer.

13. The transducer of claim 7, wherein the first pole tip has an area that is at least two orders of magnitude greater than that of the second pole tip.

14. The transducer of claim 7, wherein the second pole layer has a trailing side that forms an acute angle with the second pole tip along the trailing edge.

15. A transducer for recording information on a relatively-moving medium, the transducer comprising:
- a body having a leading end, a trailing end, and a medium-facing surface;
- a first soft magnetic layer disposed in the body and terminating at a first pole tip disposed adjacent to the medium-facing surface;
- a second soft magnetic layer that is magnetically coupled to the first soft magnetic layer in a part of the body distal to the media-facing surface, the second soft magnetic layer terminating at a second pole tip disposed adjacent to the medium-facing surface, the second pole tip having a leading edge and a trailing edge, such that the leading edge is closer than the trailing edge to the leading end, the trailing edge meeting the second pole tip at an acute corner; and
- a nonmagnetic layer adjoining the trailing edge.

16. The transducer of claim 15, wherein the nonmagnetic layer has a thickness that is in a range between about one hundred Angstroms and about one micron.

17. The transducer of claim 15, wherein the trailing edge is closer than the leading edge to the medium.

18. The transducer of claim 15, wherein the trailing edge is longer than the leading edge.

19. The transducer of claim 15, wherein the second pole tip has a substantially trapezoidal shape.

20. The transducer of claim 15, wherein the second pole tip is separated from the first pole tip by the nonmagnetic layer.

21. The transducer of claim 15, wherein the first pole tip has an area that is at least two orders of magnitude greater than that of the second pole tip.

\* \* \* \* \*